(12) United States Patent
Sakamura et al.

(10) Patent No.: US 7,882,030 B2
(45) Date of Patent: Feb. 1, 2011

(54) CONNECTION INFORMATION MANAGEMENT SYSTEM FOR MANAGING CONNECTION INFORMATION USED IN COMMUNICATIONS BETWEEN IC CARDS

(75) Inventors: Ken Sakamura, 9-2, Osaki 4-chome, Shinagawa-ku, Tokyo (JP); Noboru Koshizuka, 27-20, Nishikubo 2-chome, Musashino-shi, Tokyo (JP); Kazuhiko Ishii, Yokohama (JP); Kensaku Mori, Yokohama (JP); Hiroshi Aono, Yokosuka (JP); Sadayuki Hongo, Yokohama (JP)

(73) Assignees: Ken Sakamura, Tokyo (JP); Noboru Koshizuka, Musashino-shi (JP); NTT DoCoMo, Inc., Tokyo (JP)

( * ) Notice: Subject to any disclaimer, the term of this patent is extended or adjusted under 35 U.S.C. 154(b) by 1929 days.

(21) Appl. No.: 10/457,525

(22) Filed: Jun. 10, 2003

(65) Prior Publication Data
US 2003/0236744 A1 Dec. 25, 2003

(30) Foreign Application Priority Data
Jun. 10, 2002 (JP) .......................... P2002-169116

(51) Int. Cl.
*G06Q 40/00* (2006.01)
(52) U.S. Cl. ............................ 705/41; 705/38; 705/66; 705/68; 709/229; 709/203
(58) Field of Classification Search .................. 709/229, 709/203, 311; 705/38, 41, 66, 68; 235/375, 235/380; 380/24, 23; 395/235
See application file for complete search history.

(56) References Cited

U.S. PATENT DOCUMENTS
2002/0124092 A1 * 9/2002 Urien .......................... 709/229

FOREIGN PATENT DOCUMENTS
JP          2000-059357        2/2000
WO          WO 98/57474     * 12/1998
WO          WO 01/60026        8/2001

* cited by examiner

*Primary Examiner*—Calvin Loyd Hewitt, II
*Assistant Examiner*—Cristina Owen Sherr
(74) *Attorney, Agent, or Firm*—Oblon, Spivak, McClelland, Maier & Neustadt, L.L.P.

(57) ABSTRACT

Each IC card 1 notifies a server 3 of the ID of the IC card and the connection information of a terminal device to which the IC card is connected. The server 3 stores the ID and the connection information in a database 4 while associating the ID and the connection information with each other. When an IC card 1 communicates with another IC card, the IC card 1 requests the connection information concerning the destination IC card from the server 3 while specifying the ID of this IC card. The server 3 searches the database 4 for the connection information corresponding to the ID specified by the request, and notifies the requesting IC card 1 of the acquired connection information. This enables communications between IC cards even if the terminal device to which a destination IC card is connected has been changed in the past.

14 Claims, 4 Drawing Sheets

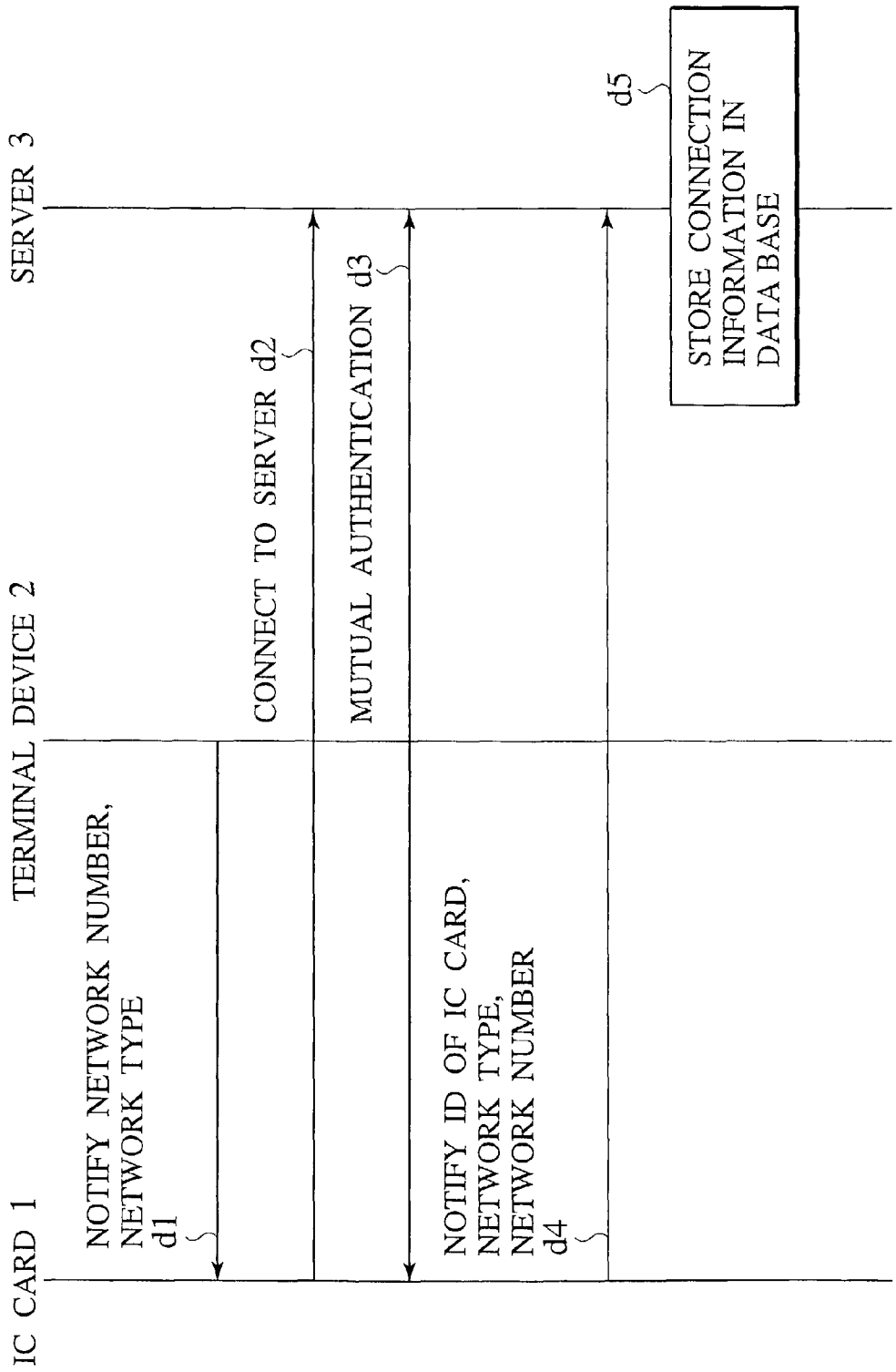

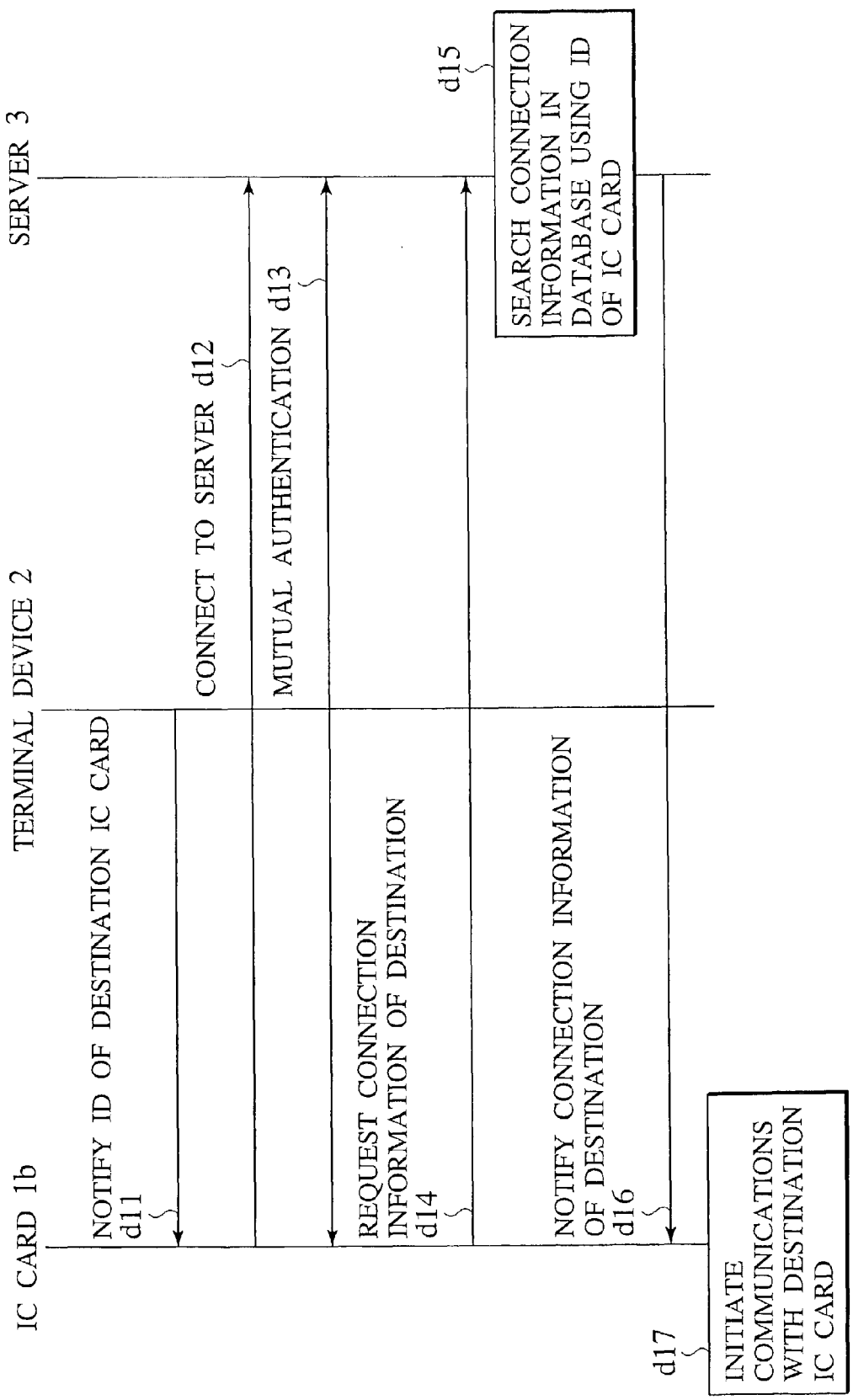

CONNECTION INFORMATION MANAGEMENT SYSTEM FOR MANAGING CONNECTION INFORMATION USED IN COMMUNICATIONS BETWEEN IC CARDS

CROSS-REFERENCE TO RELATED APPLICATIONS

This application is based upon and claims the benefit of priority from Japanese Patent Application No. 2002-169116 filed Jun. 10, 2002; the entire contents of which are incorporated herein by reference.

BACKGROUND OF THE INVENTION

1. Field of the Invention

The present invention relates to a connection information management system and a connection information management method for managing connection information used in communications between IC cards. The present invention also relates to an IC card and a server for use in the foregoing connection information management system and connection information management method.

2. Description of Related Art

In recent years, IC cards having unique IDs have rapidly become popular. In general, an IC card is inserted into a predetermined slot of a cellular phone or connected to a personal computer, which is connected to the Internet, by the user thereof. Thus, the IC card can communicate with other IC cards, which are similarly connected to other cellular phones, personal computers or the like.

For example, when an IC card is inserted into a slot of a cellular phone, communication using phone numbers is performed. On the other hand, when an IC card is connected to a personal computer, communication using IP addresses is performed. In order to enable such communication between IC cards, terminal devices, such as cellular phones and personal computers, to which IC cards are connected, are designed so that connection information, such as phone numbers and the IP addresses of terminal devices to which other IC cards are connected, is registered in advance.

However, such IC cards have the following problem: when a terminal device having another IC card connected thereto has been changed to another terminal device having different connection information by the user of the other IC card, communication can no longer be performed by using the connection information previously registered for the other IC card.

SUMMARY OF THE INVENTION

An object of the present invention is to provide a connection information management system and a connection information management method in which IC cards can communicate with each other even if a terminal device having a destination IC card connected thereto has been changed.

A first aspect of the present invention is a connection information management system for managing connection information used in communications between IC cards. Each IC card includes: a notification unit configured to notify a server of the ID of the IC card and connection information of a terminal device having the IC card connected thereto, through a network; a request unit configured to request, from the server, connection information of a terminal device having another IC card connected thereto while specifying the ID of the other IC card; and an acquisition unit configured to acquire the requested connection information from the server.

The server includes: a database configured to store the ID and the connection information which have been notified by each IC card, while associating the ID and the connection information with each other; a search unit configured to search the connection information stored in the database for the connection information corresponding to the ID specified by the request when the request has been made by an IC card; and a notification unit configured to notify the requesting IC card of the search-acquired connection information.

In the present aspect, the server stores the ID and the connection information concerning each IC card while associating them with each other. When an IC card communicates with another IC card, the IC card requests from the server the connection information of a terminal device having the destination IC card connected thereto while specifying the ID of the destination IC card, thus acquiring the current connection information of the destination. This enables the IC card to communicate with the destination IC card by using the acquired connection information even if the terminal device having the destination IC card connected thereto has been changed in the past.

Herein, a "terminal device" means a cellular phone, a personal computer, or the like, which can connect to a network in a state where an IC card is connected thereto. Moreover, "networks" include telephone networks, the Internet, and the like, including wired and wireless networks.

A second aspect of the present invention is a connection information management method for managing connection information used in communications between IC cards. Each IC card executes the steps of: notifying a server of the ID of the IC card and connection information of a terminal device having the IC card connected thereto, through a network; and requesting, from the server, connection information of a terminal device having another IC card connected thereto while specifying the ID of the other IC card. The server executes the steps of: storing the ID and the connection information, which have been notified by each IC card, while associating the ID and the connection information with each other; searching the connection information stored in the database for the connection information corresponding to the ID specified by the request when the request has been made by an IC card; and notifying the requesting IC card of the search-acquired connection information.

Another object of the present invention is to provide an IC card and a server for use in the above-described connection information management system and connection information management method.

A third aspect of the present invention is an IC card to be connected to a terminal device capable of communicating with a server through a network. The IC card includes: a notification unit configured to notify a server of the ID of the IC card and connection information of a terminal device having the IC card connected thereto, through a network; a request unit configured to request, from the server, connection information of a terminal device having another IC card connected thereto while specifying the ID of the other IC card; and an acquisition unit configured to acquire the requested connection information from the server.

The above-described IC card may further include an authentication unit configured to perform mutual authentication with the server. In this case, the notification unit notifies the ID and the connection information after the mutual authentication with the server.

In the present aspect, when the IC card notifies the server of the ID and the connection information, the IC card and the server perform mutual authentication, thus preventing the ID and connection information notified by a forged IC card from being stored in the server.

The above-described IC card may further include an authentication unit configured to perform mutual authentication with the server. In this case, the request unit requests the connection information after the mutual authentication with the server.

In the present aspect, when the IC card requests the ID and the connection information concerning the destination IC card from the server, the IC card and the server perform mutual authentication, thereby making it possible to prevent the ID and the connection information from leaking to a forged IC card.

In the above-described IC card, the notification unit should notify the ID and the connection information when the IC card is connected to the terminal device.

In the present aspect, when the IC card is connected to the terminal device, the IC card notifies the server of the ID and the connection information, thereby making it possible to store the latest connection information in the server.

In the above-described IC card, the notification unit should notify the ID and the connection information when the terminal device having the IC card connected thereto is connected to the network.

In the present aspect, when the terminal device is connected to the network, the IC card notifies the server of the ID and the connection information, thereby making it possible to store the latest connection information in the server.

In the above-described IC card, the connection information should contain at least the network number of the terminal device.

In the present aspect, the connection information contains the network number of the terminal device as the minimum information required for the IC card to communicate with another IC card. Herein, "network number" means a phone number, an IP address, or the like, which is information used for the communication links between terminal devices.

In the above-described IC card, the connection information may further contain a network type.

In the present aspect, in the case where there is a plurality of types of network, the server can store the ID of the IC card, the network number of the terminal device, and the network type while associating them with one another by making the connection information contain the network type.

A fourth aspect of the present invention is a server capable of connecting to terminal devices having IC cards connected thereto, through a network. The server includes: a database configured to store the ID and connection information which have been notified by each IC card, while associating the ID and the connection information with each other; a search unit configured to search the connection information stored in the database for the connection information corresponding to the ID specified by a request when an IC card has made the request for the connection information of the terminal device having another IC card connected thereto while specifying the ID of the other IC card; and a notification unit configured to notify the requesting IC card of the search-acquired connection information.

The above-described server may further include an authentication unit configured to perform mutual authentication with the IC card. In this case, the server accepts notification of the ID and the connection information after the mutual authentication with the IC card.

The above-described server may further include an authentication unit configured to perform mutual authentication with the IC card. In this case, the server accepts the request for the connection information after the mutual authentication with the IC card.

In the above-described server, the connection information should contain at least the network number of the terminal device.

In the above-described server, the connection information may further contain a network type.

BRIEF DESCRIPTION OF THE DRAWINGS

FIG. 5 is a timing chart showing an example of the process for storing the ID of an IC card and the connection information of a terminal device in the server.

FIG. 6 is a timing chart showing an example of the process executed when an IC card communicates with another IC card.

DETAILED DESCRIPTION OF EMBODIMENT

Figure 1:
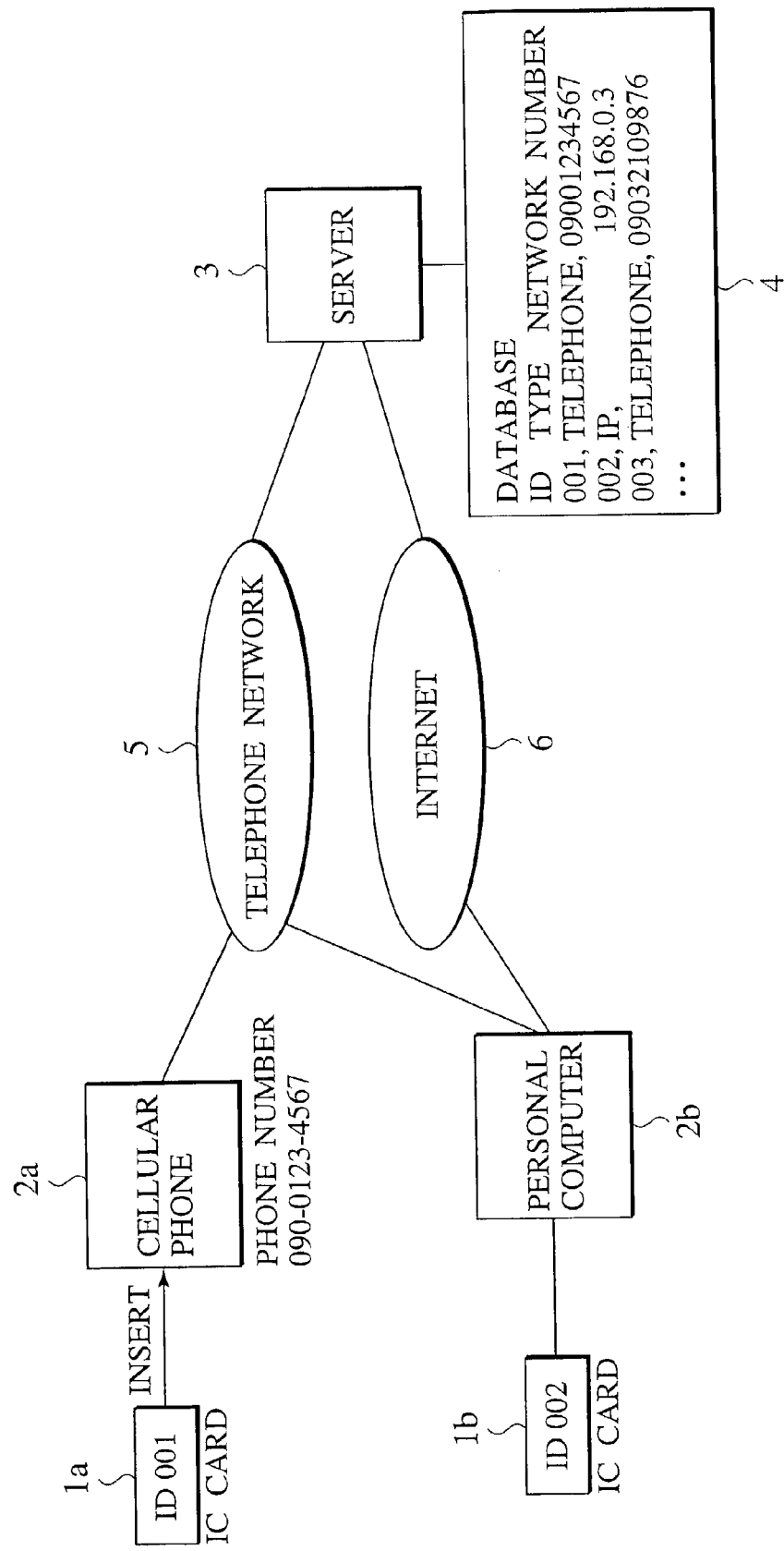
FIG. 1 is a block diagram showing the configuration of a connection information management system for IC cards, according to one embodiment.

As shown in the block diagram of FIG. 1, in a connection information management system for IC cards according to one embodiment, an IC card 1a having the ID of 001 is inserted into a predetermined slot of a cellular phone 2a, and an IC card 1b having the ID of 002 is connected to a personal computer 2b. The cellular phone 2a performs wireless communications through a telephone network 5. The personal computer 2b is, for example, connected to the telephone network 5 through a telephone line and to the Internet 6 through a dedicated line. A server 3 is, for example, connected to the telephone network 5 through a telephone line and to the Internet 6 through a dedicated line.

Herein, the cellular phone 2a and the personal computer 2b are generically named "terminal devices 2," and the telephone network 5 and the Internet 6 are generically named "networks." Incidentally, the telephone network 5 and the Internet 6 are sometimes used integrally. However, herein, for convenience, it is assumed that communication using phone numbers is performed between terminal devices in the telephone network 5, and it is also assumed that communication using the IP addresses is performed between terminal devices in the Internet 6.

Moreover, different kinds of network such as a telephone network or the Internet are referred to as "network types," and phone numbers and IP addresses are generically named "network numbers." For example, the network number is a phone number in the case where the network is a telephone network, and is an IP address in the case where the network is the Internet. Network numbers are different between terminal devices having different network types as a matter of course. Even in the same network, network numbers are different for each terminal device. "Connection information" includes at least the network number of a terminal device. In the present embodiment, the connection information further includes a network type.

Figure 2:
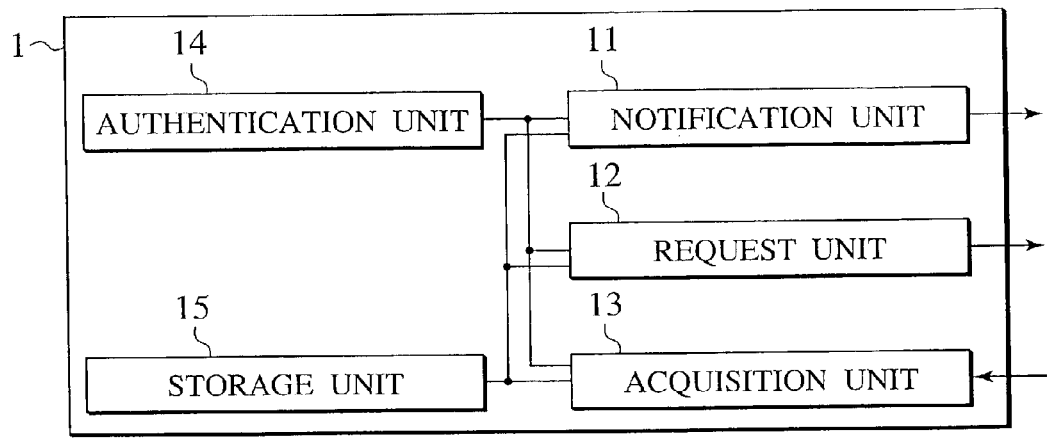
FIG. 2 is a function block diagram showing the configuration of the main part of an IC card shown in FIG. 1.

An IC card 1 communicates, through a terminal device 2 having the IC card connected thereto, with another IC card connected to another terminal device. As shown in the function block diagram of FIG. 2, an IC card 1 has a notification unit 11, a request unit 12, an acquisition unit 13, an authentication unit 14, and a storage unit 15 in the main part thereof The notification unit 11 notifies the server 3 of the ID of the IC card 1 and the connection information of a terminal device having the IC card 1 connected thereto, through a network. The request unit 12 requests from the server 3 the connection information of a terminal device having another IC card connected thereto while specifying the ID of the other IC card. The acquisition unit 13 acquires the connection information requested by the request unit 12 from the server 3. The authentication unit 14 performs mutual authentication with the server 3 when the IC card 1 communicates with the server 3. The storage unit 15 stores the ID and the connection information. In addition, the IC card 1 performs the process for receiving the connection information of the terminal device 2 connected thereto from the terminal device, and so on. The process in each unit may be executed by a dedicated LSI chip or may be executed by a program downloaded to a predetermined built-in memory.

Figure 3:
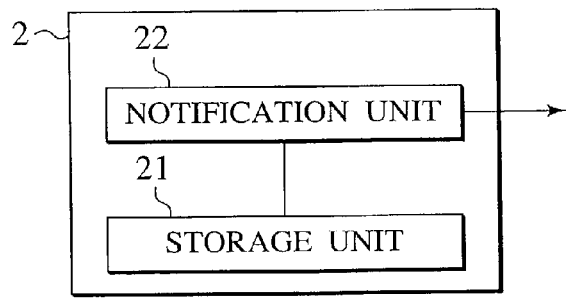
FIG. 3 is a function block diagram showing the configuration of the main part of the server shown in FIG. 1.

As shown in the function block diagram of FIG. 3, a terminal device 2 has a storage unit 21 and a notification unit 22 in the main part thereof. The storage unit 21 stores the connection information of the terminal device, the IDs and the connection information of the destination IC cards, and the connection information of the server 3. The notification unit 22 reads out the ID and connection information from the storage unit 21 to notify an IC card 1 connected to the terminal device. The process in each unit may be executed by a dedicated LSI chip or may be executed by a program downloaded to a predetermined built-in memory.

Figure 4:
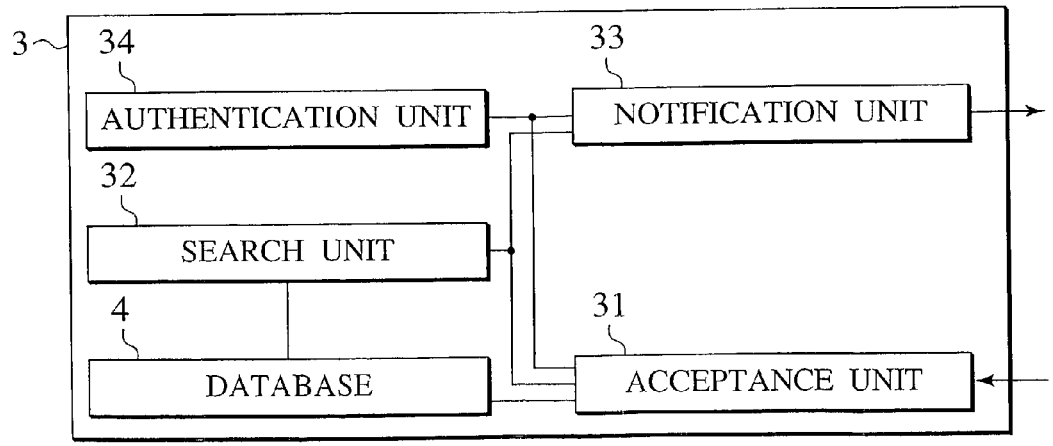
FIG. 4 is a function block diagram showing the configuration of the main part of a terminal device shown in FIG. 1.

As shown in the function block diagram of FIG. 4, the server 3 has an acceptance unit 31, a database 4, a search unit 32, a notification unit 33, and an authentication unit 34 in the main part thereof. The acceptance unit 31 accepts the ID and connection information notified by an IC card 1. The database 4 stores the ID and the connection information while associating them with each other. The search unit 32 searches connection information stored in the database 4 in response to a request from an IC card 1. The notification unit 33 notifies the requesting IC card 1 of the connection information acquired by a search. The authentication unit 34 performs mutual authentication with an IC card 1. The server 3 is constituted of, for example, a computing machine. A program executes the process in each unit.

Next, an example of the process for storing the connection information of an IC card 1 in the server 3 will be described using FIG. 5. This process is initiated by any one of the following occasions: (1) when the IC card 1 is connected to a terminal device 2, and (2) when a terminal device 2 having the IC card 1 connected thereto is electrically connected to a network.

When any one of the above-described (1) and (2) occur, the terminal device 2 notifies the IC card 1 of the connection information of the terminal device (d1). Herein, if the terminal device 2 has a network number, the terminal device 2 notifies the IC card 1 of the network number. Even when the terminal device 2 has no network number, if the terminal device 2 has been assigned a network number upon connecting to the network, the terminal device 2 notifies the IC card 1 of the assigned network number. Moreover, the terminal device 2 also notifies the IC card 1 of the network type of the terminal device 2.

The IC card 1 connects to the server 3 through the terminal device 2 by using the IP address or the phone number of the server 3 which is registered therein in advance (d2). After this connection, the IC card 1 and the server 3 perform mutual authentication, and the server 3 confirms that the party on the other end is a managed object and not a forged IC card (d3).

For this process of mutual authentication, for example, a technology called PKI is used. In this technology, certification information issued by a predetermined issuer is registered in the IC card 1 and the server 3 individually, and the IC card 1 and the server 3 authenticate each other by comparing these pieces of certification information.

After mutual authentication, the IC card 1 notifies the server 3 of the ID of the IC card 1, the network number of the terminal device 2, and the network type (d4).

The server 3 stores the ID, the network type, and the network number, which have been notified by the IC card 1, in the database 4 while associating them with one another (d5). At this time, if the connection information concerning the IC card is stored for the first time, registration is carried out. On the other hand, if it is stored for the second time or more, an update is made. The above-described processes are executed for all IC cards and all terminal devices connected to the network.

Next, an example of the process executed when an IC card 1 communicates with another IC card will be described using FIG. 6.

When a terminal device 2 needs to communicate with another IC card, the terminal device 2 notifies an IC card 1 connected to the terminal device 2 of the ID of the destination IC card that is stored in the storage unit 21 in advance (d11).

The IC card 1, which has received the ID, connects to the server 3 (d12) and performs mutual authentication with the server 3 (d13). The processes of d12 and d13 are executed similarly to the processes of d2 and d3 in FIG. 5.

After mutual authentication, the IC card 1 requests from the server 3 the connection information of a terminal device having the destination IC card connected thereto while specifying the ID of the destination IC card (d14).

The server 3 searches the connection information stored in the database 4 for the connection information corresponding to the ID specified by the request (d15), and notifies the requesting IC card 1 of the acquired connection information (d16).

The IC card 1, which has acquired the connection information of the destination, initiates communications with the destination IC card by using the acquired connection information (d17).

As described above, in the present embodiment, the ID of each IC card 1 and the connection information of a terminal device 2 having the IC card 1 connected thereto are associated with each other to be stored by the server 3. When an IC card 1 communicates with another IC card, the IC card 1 requests the connection information of the destination from the server 3 while specifying the ID of the destination IC card, thus acquiring the connection information of the current terminal device having the destination IC card connected thereto. This enables the IC card 1 to acquire the current connection information of the destination terminal device and to communicate with the destination IC card by using the connection information even if the terminal device having the destination IC card connected thereto has been changed in the past.

According to the present embodiment, when an IC card 1 notifies the server 3 of the ID and the connection information, the IC card 1 and the server 3 perform mutual authentication, thus preventing an ID and connection information notified by a forged IC card from being stored in the server 3.

According to the present embodiment, when an IC card 1 requests the ID and the connection information of a destination IC card from the server 3, the IC card 1 and the server 3 perform mutual authentication, thereby making it possible to prevent the ID and the connection information from leaking to a forged IC card.

According to the present embodiment, when an IC card 1 is connected to a terminal device 2, or when a terminal device 2 having an IC card 1 connected thereto is connected to a network, the ID and the connection information of the IC card 1 are notified to the server 3 by the IC card 1 to be stored in the database 4, thereby making it possible to manage the latest connection information in the server 3.

What is claimed is:

1. A connection information management system for managing connection information used in communications between IC cards,
wherein each IC card comprises:
a notification unit configured to notify a server of the ID of the IC card and connection information of a terminal device having the IC card connected thereto, through a network;
a request unit configured to request, from the server, connection information of a terminal device having another IC card connected thereto while specifying the ID of the other IC card; and
an acquisition unit configured to acquire the requested connection information from the server, and wherein the server comprises:
a database configured to store the ID and the connection information that have been notified by each IC card, while associating the ID and the connection information with each other;
a search unit configured to search the connection information stored in the database for the connection information corresponding to the ID specified by the request when the request has been made by the IC card; and
a notification unit configured to notify the requesting IC card of the search-acquired connection information.

2. A connection information management method for managing connection information used in communications between IC cards,
wherein each IC card executes the steps of:
notifying a server of the ID of the IC card and connection information of a terminal device having the IC card connected thereto, through a network; and
requesting, from the server, connection information of a terminal device having another IC card connected thereto while specifying the ID of the other IC card, and
wherein the server executes the steps of:
storing the ID and the connection information, which have been notified by each IC card, in a database while associating the ID and the connection information with each other;
searching the connection information stored in the database for the connection information corresponding to the ID specified by the request when the request has been made by an IC card; and
notifying the requesting IC card of the search-acquired connection information.

3. An IC card to be connected to a terminal device capable of communicating with a server through a network, the IC card comprising:
a notification unit configured to notify the server of the ID of the IC card and connection information of a terminal device having the IC card connected thereto, through the network;
a request unit configured to request, from the server, connection information of a terminal device having another IC card connected thereto while specifying the ID of the other IC card; and
an acquisition unit configured to acquire the requested connection information from the server.

4. The IC card of claim 3, further comprising:
an authentication unit configured to perform mutual authentication with the server,
wherein the notification unit notifies the ID and the connection information after the mutual authentication with the server.

5. The IC card of claim 3, further comprising:
an authentication unit configured to perform mutual authentication with the server,
wherein the request unit requests the connection information after the mutual authentication with the server.

6. The IC card of claim 3,
wherein the notification unit notifies the ID and the connection information when the IC card is connected to the terminal device.

7. The IC card of claim 3,
wherein the notification unit notifies the ID and the connection information when the terminal device having the IC card connected thereto is connected to the network.

8. The IC card of claim 3,
wherein the connection information contains at least the network number of the terminal device.

9. The IC card of claim 8,
wherein the connection information further contains a network type.

10. A server capable of connecting to terminal devices having IC cards connected thereto, through a network, the server comprising:
a database configured to store the ID and connection information which have been notified by each IC card, while associating the ID and the connection information with each other;
a search unit configured to search the connection information stored in the database for the connection information corresponding to the ID specified by a request when the IC card has made the request for the connection information of the terminal device having another IC card connected thereto while specifying the ID of the other IC card; and
a notification unit configured to notify the requesting IC card of the search-acquired connection information.

11. The server of claim 10, further comprising:
an authentication unit configured to perform mutual authentication with the IC card,
wherein the server accepts notification of the ID and the connection information after the mutual authentication with the IC card.

12. The server of claim 10, further comprising:
an authentication unit configured to perform mutual authentication with the IC card,
wherein the server receives the request for the connection information after the mutual authentication with the IC card.

13. The server of claim 10,
wherein the connection information contains at least the network number of the terminal device.

14. The server of claim 13,
wherein the connection information further contains a network type.

* * * * *